Figures 1, 2:
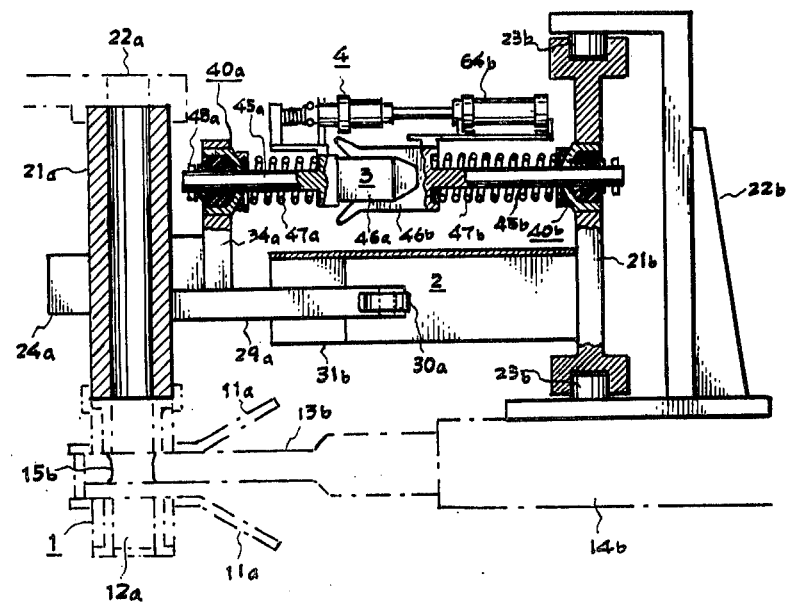

United States Patent

Nagase et al.

[11] 4,156,551
[45] May 29, 1979

[54] DEVICE FOR AUTOMATICALLY CONNECTING AND DISCONNECTING PIPINGS AND WIRINGS BETWEEN ROLLING STOCKS

[76] Inventors: Minoru Nagase, 2-3-108, Uzamoridia, Higar Himada-ku, Kobe; Masao Kouzuki, 745-25, Isskiki, Huooka-cho, Kakogawa-shi, Hyogo-ken; Kenji Kawato, 4245-17, Karati, Arino-cho, Kita-Kuo, Kobe; Kunitoshi Doi, 1-8-70, Higashi Froju, Akashi-shi, Higoga-ken, all of Japan

[21] Appl. No.: 878,778

[22] Filed: Feb. 17, 1978

[30] Foreign Application Priority Data

Feb. 21, 1977 [JP] Japan .................................. 52/18381

[51] Int. Cl.² .............................................. H01R 3/04
[52] U.S. Cl. ........................................ 339/15; 339/10
[58] Field of Search ................... 339/15, 10, 75 R, 76, 339/79, 89 R

[56] References Cited

U.S. PATENT DOCUMENTS 3,085,219  4/1963  Bass, Jr. ................................. 339/15
4,094,567  6/1978  Karcher et al. ....................... 339/15

Primary Examiner—Roy Lake
Assistant Examiner—DeWalden W. Jones
Attorney, Agent, or Firm—Eugene E. Geoffrey, Jr.

[57] ABSTRACT

Coupling means for vehicles such as rolling stock which includes railroad cars, tractors and trailers and the like which includes apparatus for automatically coupling fluid carrying pipes and electrical connectors when the tractors and trailers or other vehicles such as railroad cars are mechanically coupled.

3 Claims, 4 Drawing Figures

DEVICE FOR AUTOMATICALLY CONNECTING AND DISCONNECTING PIPINGS AND WIRINGS BETWEEN ROLLING STOCKS

This invention relates to a novel and improved device for automatically connecting and disconnecting fluid piping and electric wiring when coupling and decoupling rolling stock such as vehicles operating on both railroad tracks and highways.

Although automatic couplers for rolling stock have already been put into practice, connecting and disconnecting operations of pipes and wires between the vehicles are still carried out manually through hose couplers and electric connectors. Therefore, the pipes and wires must be connected manually after actuation of the automatic coupler and disconnected manually before decoupling. Such manual operations involve substantial labor and danger and sometimes result in uncertain connections. Moreover, in a place, such as a classification yard for freight cars where frequent coupling and decoupling operations take place, coupling operations of pipes and wires are sometimes overlooked.

Accordingly, an object of this invention is to provide a novel and improved device for automatically or semi-automatically connecting and disconnecting the pipes and wires in cooperation with the automatic coupler for rolling stock such as railroad cars and other vehicles, thereby removing the above-mentioned problems.

This object is attained by the device of this invention, which is attached to both draw bar and draw bar guide of the prior art automatic coupler for vehicles and arranged to precisely position the pipe and wire connectors through tentacles and tentacle guides before the draw bar guided by the draw bar guide reaches a predetermined position in which a coupling pin is inserted in a coupling pin hole, and to connect automatically and certainly the pipes and wires so that a little deviation in position of both vehicles, if any, is followed by universal joints and springs disposed in the connecting section thereof.

More particularly, the device of this invention consists of first coupling means attached to one rolling vehicle and second coupling means attached to the other rolling vehicle. As a feature of this invention, the first coupling means includes tentacle-like means arranged rotatably about a substantially verticle axis and having a neutral position restoring mechanism, first fluid piping connecting means attached to the tentacle means through a universal joint and arranged in substantially parallel relationship to the tentacle means and first electric wiring connecting means attached to the first fluid piping connecting means and arranged substantially parallel thereto, and the second coupling means includes tentacle guide means arranged rotatably about a substantially vertical axis and facing the tentacle means for guiding the top thereof, second fluid piping connecting means attached to the tentacle guide means through a universal joint and facing the first fluid piping connecting means and second electric wiring connecting means attached to the second fluid piping connecting means and facing the first electric wiring connecting means.

These and other objects and features of this invention will be described in more detail hereinunder with reference to the accompanying drawings.

Figure 3:
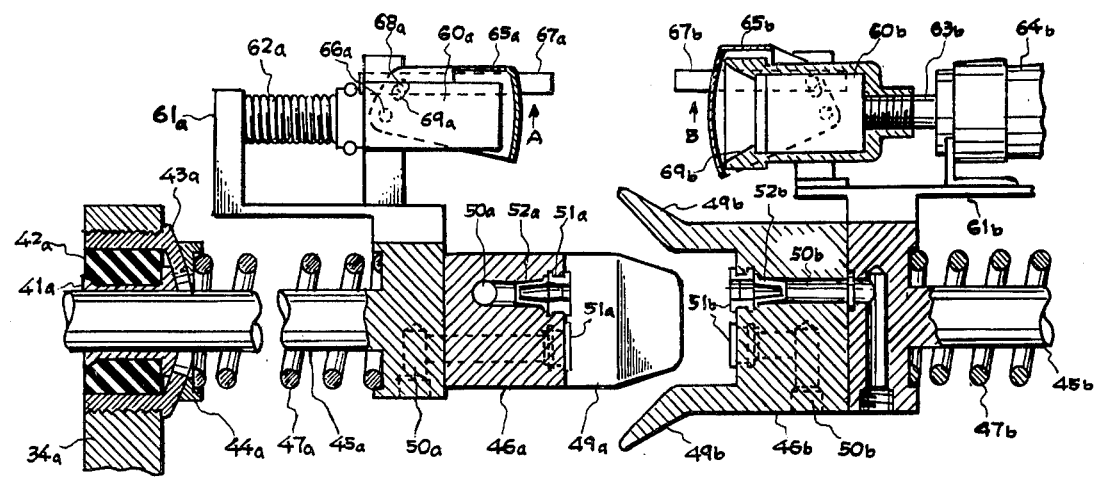
Figure 4:
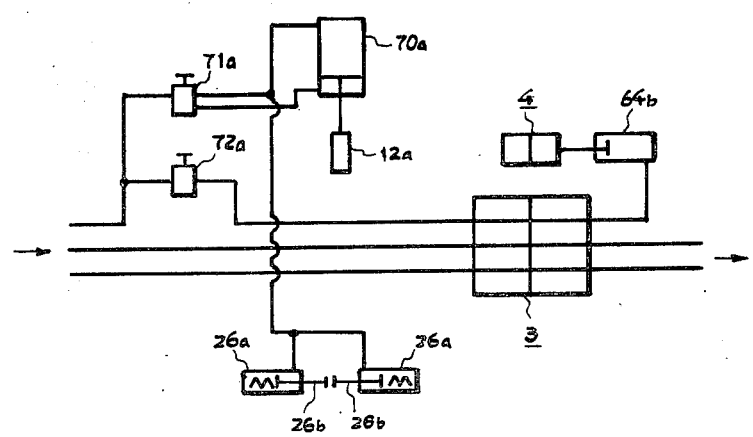

IN THE DRAWINGS:

FIG. 1 is a side view in partial section representing an embodiment of the device according to this invention;
FIG. 2 is a plan view of the embodiment of FIG. 1;
FIG. 3 is an enlarged cross-sectional side view representing an essential part of the embodiment of FIG. 1; and
FIG. 4 is an explanatory diagram representing functional components of the device according to this invention.

Throughout the drawings, like reference numerals are used to denote corresponding components. Moreover, in order to facilitate an understanding of the invention the suffix "a" is added to each reference numeral belonging to the first vehicle such as rolling stock or tractor and another suffix "b" is added to those numerals relating to the second vehicle such as rolling stock or trailer.

Referring to FIGS. 1 and 2, the components included in the device of this invention are shown in solid lines, while those included in the prior art structure are shown in broken lines. In the drawings the lead vehicle is at the lefthand side and the trailing vehicle is at the righthand side. The vehicles are coupled through a known coupler 1 and their air pipings and electric wirings are connected through air coupler 3 and electric connector 4 by an aid of positioning mechanism 2.

The main coupler 1 comprises a draw bar guide 11a and a coupling pin 12a which belong to the lead vehicle or tractor and a draw bar 13b and a draw bar holder 14b which belong to the trailing vehicle or trailer so that when the tractor approaches the trailer, the draw bar 13b is guided by the draw bar guide 11a until the coupling pin 12a comes into alignment with a coupling pin hole 15b in the draw bar 13b and is inserted therein automatically with pneumatic force, as well known in the art.

According to this invention, the tractor includes further a vertical tubular bar 21a supported above the coupling pin 12a and coaxially therewith by a bracket 22a so as to be rotatable by about 65 degrees in the both directions, and the trailer further includes a vertical flat bar 21b supported rotatably by a bracket 22b and pivoted at both ends 23b.

The bar 21a has a forward projection 24a which is pushed from the both sides by piston rods 25a of a pair of air cylinders 26a which are fixed to the tractor and provided with restoration springs respectively therein. These components constitute a neutral position restoring mechanism which functions constantly to urge the bar 21a to return to its neutral position as shown. The rotatable bar 21b is also provided with a neutral position restoring mechanism including a pair of balancing springs 28b arranged between the bracket 22b and lateral arms 27b extending from the bar 21b for keeping its neutral position as shown.

The vertical bar 21a also includes a tentacle member 29a extending horizontally backwards therefrom and having a roller 30a at the top. Facing to the tentacle-like member 29a there is a tentacle guide 31b which extends forwardly from the bar 21b. The tentacle guide 31b has a pair of side walls 32b which diverge forwardly at first and then converge backwardly to form a guide channel 33b as shown by dotted lines in FIG. 2.

Next, the air coupler 3 and electric connector 4 will be described with reference to FIG. 3 together with FIGS. 1 and 2. A bracket 34a is fixed to the tentacle member 29a and a universal joint 40a is supported by the bracket 34a. The universal joint 40a consists of an innermost metallic bearing 41a, a flexible rubber bushing 42a, a spherical seat 43a and an annular spring receptacle 44a, which are arranged coaxially in this order. Another universal joint 40b having the same structure as 40a and facing it is supported by the vertical bar 21b. A support rod 45a of a coupling block 46a is held by the universal joint 40a so as to be movable in the horizontal or axial direction and, at the same time, rotatable to some extent about the center of curvature of the spherical seat 43a depending upon the flexibility of the rubber bushing 42a. A compression spring 47a is inserted between the receptacle 44a of the universal joint 40a and the coupling block 46a and a stop 48a is fixed to the end of the support rod 45a, so that the spring 47a urges always the coupling block 46a away from the joint 40a to hold the support rod 45a horizontally. A support rod 45b of another coupling block 46b is held by the universal joint 40b, in the same fashion as above, by the aid of another compression spring 47b.

The coupling block 46a has a pair of guide vanes 49a diverging mutually in a V-shaped and the coupling block 46b has a pair of guide vanes 49b which are shaped similarly but arranged orthogonally to the guide vanes 49a, so that both pairs interlock with approach of the both coupling blocks 46a and 46b to enable accurate angular positioning and centering thereof.

The coupling block 46a includes a plurality of air passageways 50a bored therein. One end of the each passageway 50a opens to the butting surface of the coupling block and the other end is connected to corresponding piping in the tractor through a flexible hose (not shown). A rubber gasket 51a is fitted in the butting end of the each passageway 50a and an air filter 52a made of a sintered alloy is disposed behind the gasket 51a. The coupling block 46b includes corresponding passageways 50b having similar gaskets 51b and filters 52b. The both sets of air passageways 50a and 50b are positioned so that their butting ends engage with each other through the rubber gaskets 51a and 51b and the pipings in the tractor and trailer are tightly connected through the air coupler 3 by the aid of springs 47a and 47b when the coupling blocks 46a and 46b interlock together.

The electric connector 4 includes a connecting plug 60a supported by a bracket 61a fixed to the coupling block 46a and a connecting socket 60b supported by a bracket 61b fixed to the coupling block 46b. The plug 60a and socket 60b are arranged substantially coaxially so that the former can fit in the latter when the coupling blocks 46a and 46b interlock. The plug 60a is movable in the axial direction and is pushed to the righthand side by a buffer spring 62a. The socket 60b which is also moveable in the axial direction is coupled to a piston rod 63b of an air cylinder 64b which is fixed to the bracket 61b and may be operated either automatically or manually. The air piping of the air cylinder 64b is connected to one of the passageways 50b so that air is supplied thereto after the tractor is coupled to the trailer as the air source is located generally in the tractor, though it is not shown in the drawings to avoid undue complication.

The connecting plug 60a has a movable cover 65a pivoted thereto at 66a and a horizontal push rod 67a supported slidably in the axial direction. The push rod 67a has a lateral projecting pin 68a which is fitted in a slot 69a formed in the cover 65a as shown in dotted lines, so that the cover can rotate in the direction of the arrow A when the push rod 67a is pushed to the lefthand side. The connector socket 60b has also a movable cover 65b which is arranged in the same fashion as the cover 65a in cooperation with a horizontal push rod 67b facing the push rod 67a so that the cover 65b can rotate in the direction of the arrow B when the push rod 67b is pushed to the righthand side. Accordingly, when the socket 60b is driven by the air cylinder 64b to approach the plug 60a and both push rods 67a and 67b but against each other, the covers 65a and 65b are opened upwardly to expose the plug and socket. When the socket 60b draws nearer the plug 60a, the plug 60a is guided by the guide face 69b and fits in the socket 60b to complete electric connection.

The overall operation of the device of this invention will be described hereinunder with reference to FIG. 4 which represents in block form the air pipings involved therein. In the drawing, three pipe lines from the tractor at the lefthand side communicate with the trailer at the righthand side through the air coupler 3, one of them being used for operating the device of this invention, while the others being used in the trailer for braking and the like. One pipe line is connected through a three way valve 71a to an air cylinder 70a which operated the coupling pin 12a and to the air cylinders 26a, and also through a valve 72a and the air coupler 3 to the air cylinder 64b.

In the beginning of the coupling operation, the piston 12a is in its pushed-up position and the pistons 25a are released from the pneumatic force and urged by spring forces to effect centering of the tentacle member 29a. When the tractor and the trailer come in the coupling operation, the draw bar 13b is guided in the draw bar guide 11a and the coupling pin 12a approached the coupling pin hole 15b. Midway of this step, the tentacle member 29a comes under directional control of the tentacle guide 31b for facilitating interlocking of the guide vanes 49a and 49b of the coupling blocks 46a and 46b of the air coupler 3. When the roller 30a of the tentacle member 29a rolls into the guide channel 33b of the tentacle guide 31b, the guide vanes 49a and 49b interlock with each other and finally the air passageways 50a and 50b in both coupling blocks 46a and 46b come in precise engagement with each other through the rubber gaskets 51a and 51b to complete the air pipping connection.

At or just before this time point, the three way valve is automatically actuated to supply pneumatic force to the upper chamber of the air cylinder 70a and to the both air cylinder 26a. Thus, the pistons 25a of the air cylinders 26a are opened to both sides to release the centering function of the tentacle member 29a and leave the centering operation for the air coupler 3 to the guide vanes 49a and 49b and, at the same time, the coupling pin 12a is urged downwardly so that it is inserted in the coupling pin hole 15b to complete the mechanical coupling of both vehicles when the coupling pin comes in alignment with the pin hole.

Upon completion of the above operation, the valve 72a is actuated manually or preferably automatically to supply pneumatic force to the air cylinder 64b through the air coupler 3, so that the air cylinder 64b drives the connecting socket 60b toward the connecting plug 60a until both are fit with each other as described already to complete the electric wiring connection.

Decoupling and disconnecting operations of this device can be effected in substantially opposite order to the above and can be easily understood by those skilled in the art.

Shocks and vibrations applied to the device of this invention in any direction during running of the vehicles are absorbed completely by the rotatable bars 21a and 21b and the universal joints 40a and 40b, so that the air and electric connection are kept unchanged always and air leakage and insufficient electric contact never happens.

It should be noted that many modifications and changes may be made without departing from the scope of this invention by those skilled in the art. For example, though the electric connector was shown as being driven by an air cylinder, it may be driven by other kinds of energy sources or may be arranged so that the connection is effected simply without aid of any additional means at the same time as the coupling of the air coupler 3. Moreover, the rotatable bar 21a need not always be arranged coaxially with the coupling pin 12a. Furthermore, mechanical and geometric formations of the respective components can be alter by the designer.

We claim:

1. A device for automatically connecting and disconnecting pipings and wirings between two rolling vehicles such as railroad cars, tractors and trailers and the like consisting of first coupling means attached to one vehicle and second coupling means attached to the other vehicle said first coupling means including tentacle means having a neutral position restoring mechanism and being movable rotatably about a substantially vertical axis, first fluid piping connecting means attached to said tentacle means through a universal joint and arranged in substantially parallel relationship to said tentacle means and first electric wiring connecting means attached to said first fluid piping connecting means and arranged in substantially parallel relationship thereto, and said second coupling means including tentacle guide means moveable rotatably about a substantially vertical axis and facing said tentacle means for guiding the top thereof, second fluid piping connecting means attached to said tentacle guide means through a universal joint and facing said first fluid piping connecting means and second electric wiring connecting means attached to said second fluid piping connecting means and facing said first electric wiring connecting means, whereby said first and second fluid piping connecting means are coupled together and said first and second electric wiring connecting means are also coupled together by the aid of positioning effect caused by engagement of said tentacle and tentacle guide means.

2. A device according to claim 1, wherein one of said first and second coupling means includes further fluid cylinder means and said first and second electric wiring connecting means are arranged to be coupled together by the aid of said fluid cylinder means after completion of coupling of said first and second fluid piping connecting means.

3. A device according to claim 1, wherein said first coupling means includes a coupling pin having a substantially vertical axis and said tentacle means is movable rotatably about said axis of coupling pin.

* * * * *

UNITED STATES PATENT OFFICE
CERTIFICATE OF CORRECTION

Patent No. 4,156,551          Dated May 29, 1979

Inventor(s) Minoru Nagase et al

It is certified that error appears in the above-identified patent and that said Letters Patent are hereby corrected as shown below:

Title Page

Item (76) Inventors

Line 1, change "Uzamoridia" to --Uzumoridai--

Line 2, change "Higar Himada-ku" to --Higashinada-ku--

Line 3, change "Isskiki" to --Isshiki--

Line 4, change "Huooka-cho" to --Hiraoka-cho--

Line 6, change "Karati" to --Karato-- and change "Kita-Kuo" to --Kita-ku--

Line 7, change "Higashi Froju" to --Higashifujie--

Line 8, change "Higoga-ken" to --Hyogo-ken--

*Signed and Sealed this*

*Thirteenth* Day of *November 1979*

[SEAL]

*Attest:*

RUTH C. MASON  
*Attesting Officer*

LUTRELLE F. PARKER  
*Acting Commissioner of Patents and Trademarks*